United States Patent Office 3,403,671
Patented Oct. 1, 1968

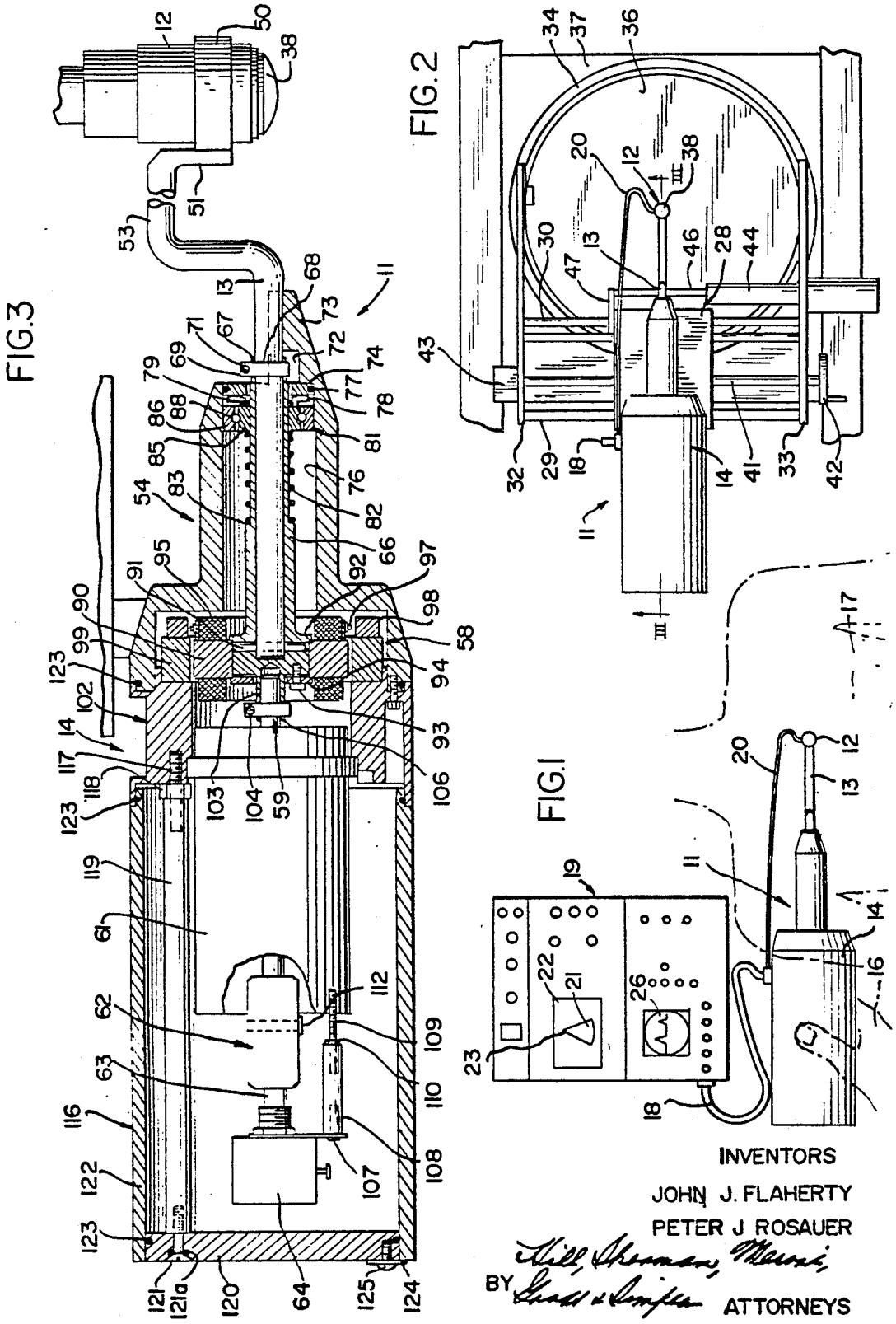

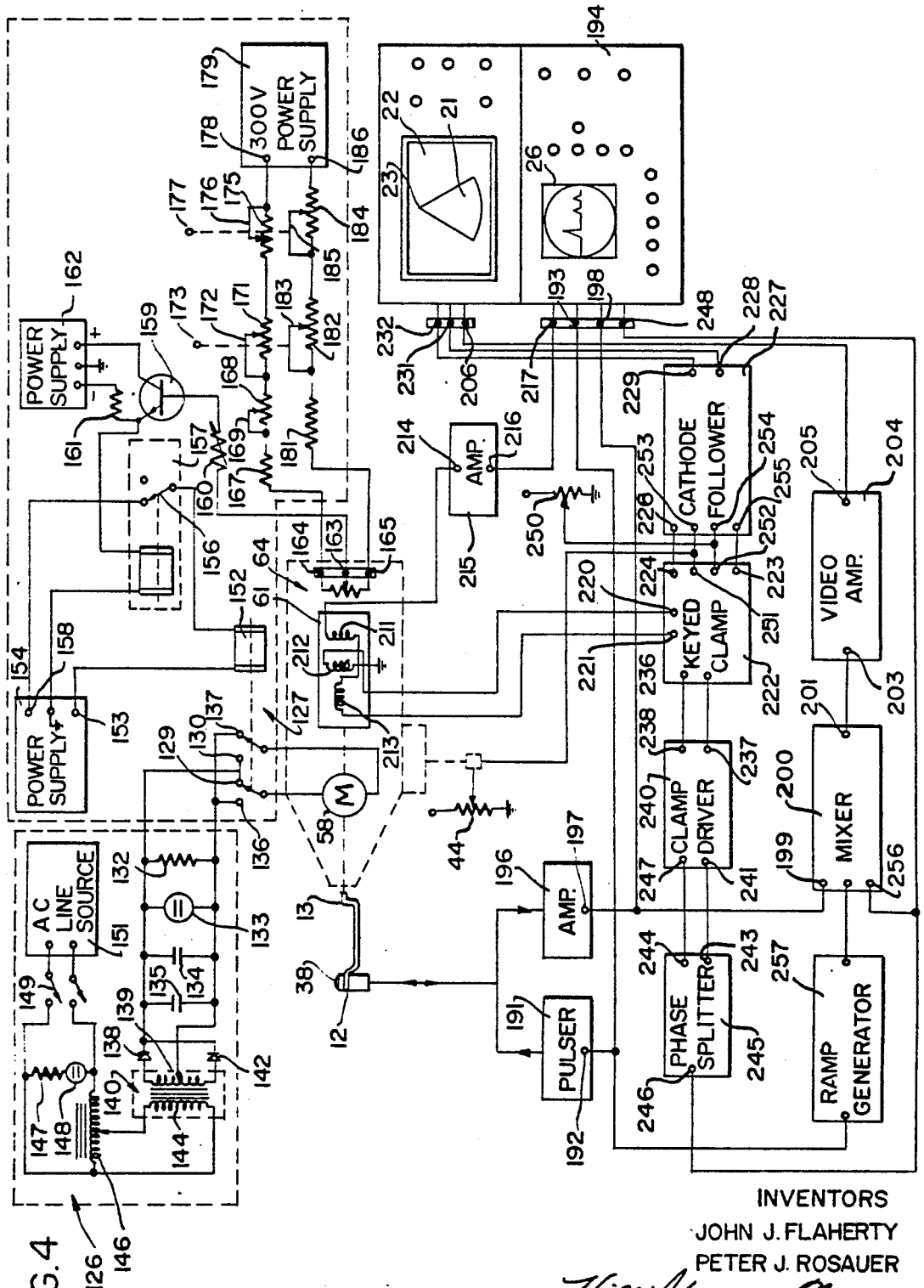

3,403,671
ULTRASONIC TRANSDUCER SYSTEM
John J. Flaherty, Elk Grove Village, and Peter J. Rosauer, Mount Prospect, Ill., assignors to Magnaflux Corporation, Chicago, Ill., a corporation of Delaware
Filed Oct. 24, 1965, Ser. No. 504,346
16 Claims. (Cl. 128—2)

ABSTRACT OF THE DISCLOSURE

Ultrasonic transducer system in which a direct mechanical coupling is provided between the rotor of an electric motor and an ultrasonic transducer with the rotor axis and the transducer axis being generally transverse to each other and with the motor being reversed at certain angular positions to effect oscillation of the transducer. The direct mechanical coupling preferably includes an elongated shaft which is preferably offset to facilitate placing the transducer in engagement with a desired surface portion of a body. Adjustment means are provided, preferably in the form of adjustable resistors connected in circuit with potentiometers connected to the rotor, for adjusting the angular spacing between limit positions and for adjusting the positions of both limit positions without changing the spacing therebetween.

---

This invention relates to an ultrasonic transducer system and more particularly to an ultrasonic transducer system having mechanical and electrical features which cooperate to produce clear, accurate, rapid, and easily interpretable indications of the position and character of internal structures within a body to facilitate rapid and reliable diagnosis of internal conditions.

The transducer system of this invention is particularly important and useful in the medical diagnosis of the human body, providing for the first time a quick, easy, reliable and safe means for examining certain crucial parts of the body which previously have not been diagnosable by known ultrasonic or X-ray diagnostic techniques. The system of this invention also provides quicker, clearer and more intelligible information for the diagnosis of those body parts which have been susceptible to previous ultrasonic and X-ray diagnosis. Although the medical uses for the principles of this invention are striking, the principles also have application in industry and elsewhere as a new improved form of ultrasonic inspection apparatus.

It is well known that different internal bodily tissues differently affect the transmission of ultrasonic waves, and that interfaces between tissues of different acoustical impedances produce detectable reflections of the waves. It is also known that ultrasonics can be used effectively at a low power level, far below that which would damage living tissues, and various ultrasonic diagnostic systems have been proposed and tested using both continuous waves and pulsed waves and using both through-transmission and reflection techniques.

Various scanning arrangements have also been proposed. For example, a system has been proposed wherein a transducer is moved in a direction generally parallel to a body surface while transmitting pulses of ultrasonic energy toward the surface and receiving echoes back from the surface and from interfaces within the body. A "B-scan" display is then produced on the screen of a cathode ray tube, the display comprising a trace in one direction representing the transmission of the pulses and a shifting of the trace in a transverse direction representing the transducer movement, the echo signals being used to intensify the spot on the screen of the cathode ray tube. This system has been used to obtain a cross-sectional indication of the structure of a human breast, with the transducer and the breast immersed in a water chamber to provide acoustical coupling between them while permitting the scanning movement of the transducer. It has been possible to detect malignant tumors with some degree of success.

Such systems as heretofore proposed have presented various difficulties which render them far less than completely satisfactory. One of the most serious problems has been to obtain diagnostic information which is intelligible to the average physician. The original single-position pulse-echo indications were almost totally incomprehensible, and the prior ultrasonic scanning techniques have produced better results but still have had serious limitations. It has been found that one defect of prior systems results from the fact that in a living human body, there is inevitably some motion of almost every organ, and rapid extensive motion of certain organs such as the heart and lungs. In the time required to obtain, by scanning, an intelligible indication from an area large enough for a reliable diagnosis, the body parts move and shift to create blurred and often inaccurate and unintelligible image indications. Another problem is that internal structures which may be of little interest diagnostically often produce indications due to multiple reflections between interfaces often partly or entirely obscure meaningful indications, so that it is impossible to tell what organs and parts of organs are being viewed on the oscilloscope screen. A further problem involves the necessity for acoustical coupling between the transducer and the body being examined. It is often medically undesirable and even hazardous to submerge certain parts of the body in liquid, and liquid-containing bags which have been devised to alleviate this problem seriously limit the movement and the placement of the transducer relative to the body.

The transducer system of this invention was evolved with the general object of overcoming the disadvantages of prior systems and of providing a small, rugged ultrasonic system which would provide quick reliable and easily interpreted indications of internal bodily structures not obtainable with prior systems.

According to an important feature of this invention an ultrasonic pulse-echo transducer assembly is provided which facilitates obtaining a visually continuous two-dimensional sector scan of the internal structure of a living body, including clearly intelligible moving indications of internal moving parts. With this assembly a flicker-free "motion picture" type indication is obtained which shows in clear detail the outlines of internal parts over an area large enough to recognize and distinguish the various parts observed.

In accordance with a specific feature of the invention, an ultrasonic transducer is supported in a manner to facilitate rapid oscillation thereof about a tangential axis through the center of the transducer face while the transducer is pulsed at a rapid rate and pulse-echo indications are produced on an oscilloscope screen. A trace on the screen corresponds to the path of the pulsed sound, and the trace is moved in an angularly transverse direction to correspond to the angular movement of the transducer axis. With this feature, a two-dimensional pulse-echo indication is obtained without necessitating lateral movement of the transducer face.

In accordance with a further important feature of the invention, the transducer assembly is constructed to produce oscillation of the transducer at a rate of 7 oscillations or more per second to produce a visually continuous or flicker-free echo indication of the internal structure of a body being examined, including a clear indication of any internal moving parts under observation. This provision is extremely important for obtaining intelligible and reliable diagnosis of living bodies, which are inevitably in constant motion. The moving indications make it possible to distinguish between important internal parts and spurious indications on unimportant nearby parts.

Another important feature of the invention involves the construction of a transducer assembly which allows direct contact coupling between the transducer and a test body while providing a two-dimentional indication of its internal structure. With this feature it is no longer necessary to submerge the body in liquid or to use a clumsy bag of liquid as coupling between the transducer and the body. The transducer can be positioned at any angle or location on the body, and the position of the transducer can be changed at will.

Specific features of the invention reside in a mechanical construction where the oscillating components have a low moment of inertia and on an electrical drive motor such as to facilitate quick reversal of the direction of rotation at each limit of the oscillatory movement and uniform angular velocity between the limits of oscillatory movement. With these features, a more uniform and accurate display of echo signals can be produced.

According to another feature of the invention a unique mechanical and electrical design of the transducer assembly provides reliable continuous speed oscillation of the transducer and easy adjustment of the speed, angle, and attitude of oscillation at a location remote from the transducer itself. With this feature an operator can control the transducer operation while viewing the echo-pulse indications on an oscilloscope screen.

According to still another feature of the invention, the transducer housing is constructed to conform to body contours, so that the face of the pulsing transducer may be placed flush against any portion of a body being examined. The housing is also waterproof to allow immersion of the transducer in a body of water for indirect acoustical coupling, if this form of coupling is desired.

Still another feature of the invention relates to the simple design of the transducer assembly which facilitates quick, easy interchange of transducers or of transducer arms and allows the assembly to be hand held for portable inspection of any position of the body and for rapid change of position when desired. With this feature it is possible to dispense with most of the troublesome positioning of the body being tested, and with the expensive cumbersome apparatus usually needed for handling a medical ultrasonic transducer.

The invaluable diagnostic feats possible with the transducer assembly of this invention are both fascinating and endless. To give but one example, it has been possible with this assembly to observe, in a moving detailed indication, the actual operation of the heart valves, and to diagnose from these observations the condition of stenosis (or fusion) of a heart valve when such a condition exists. With stenosis of either the mitral or tricuspid heart valve the actual valve members become fused and cannot open and shut properly, causing thereby a great strain on the heart and often creating a serious heart condition. Such stenosis may be either congenital or a result of disease such as rheumatic fever, and the condition has been quite difficult to diagnose before serious damage has occurred. With the ultrasonic transducer of this invention a positive substantially unequivocal diagnosis of the presence or absence of a stenosed condition is obtained in a matter of minutes, and it is even possible, after a corrective operation has been performed, to determine if the valve is then working properly and to determine if the stenosed condition returns after a period of time.

This invention contemplates other and more specific objects, features and advantages which will become more fully apparent from the following detailed description taken in conjunction with the accompanying drawings which illustrate a preferred embodiment and in which:

FIGURE 1 shows a medical diagnostic system constructed according to the invention, including oscilloscope display apparatus connected to a portable transducer unit, shown diagrammatically in use in testing a body;

FIGURE 2 is a bottom plan view showing the transducer unit mounted on a support assembly which permits adjustment of its position;

FIGURE 3 is a sectional view taken substantially along line III—III of FIGURE 2, illustrating the construction of the transducer unit; and FIGURE 4 is a schematic block diagram illustrating the circuits used in controlling movement of the transducer and in displaying indications therefrom.

Reference numeral 10 generally designates a medical ultrasonic diagnostic system constructed in accordance with the principles of this invention. As shown in FIGURE 1, the system 10 comprises a transducer assembly 11 including a transducer 12 which is firmly attached to a shaft 13 rotatably positioned on the axis of an essentially cylindrical drive unit housing 14 and protruding from one end thereof. The housing 14 is held in an operator's hand 16 in such a way that the transducer 12 is in contact with the body 17 to pulse ultrasonic energy into and receive echo pulses from the body 17 while the transducer 12 oscillates about the axis of the housing 14. A cable 18 connects the housing 14 with the control and indicating unit 19 for providing electrical connections therebetween and a second cable 20 extends to the transducer 12 it The transducer 12 is pulsed at a rapid rate, for example 500 pulses per second, while being mechanically oscillated at a lower rate, for example 10 oscillations per second, and the echo-pulse signals received by the transducer 12 are indicated on the pie-shaped image field 21 on the oscilloscope screen 22 located in the control and indicating unit 19. The pie-shaped image field 21 consists of a number of essentially vertical traces, each originating from the apex 23 and representing the path of an individual sound pulse from transducer 12, and each angularly rotated slightly to correspond to the oscillating movement of the transducer 12. When reflected sound is received by the transducer from an interface within the body, a bright-spot indication is produced on the image field 21, the intensity of the indication being proportional to the intensity of the reflected sound. The distance of the bright-spot indication from the apex 23 of the pie-shaped field 21 corresponds to the reflecting surface from the transducer 12, and all the bright-spot indications from a particular reflecting surface appear as a continuous bright line within the image field 21 of the screen 22.

The pie-shaped image field 21 is traced out twice for each oscillation of the transducer 12, and the transducer oscillates at over 7 oscillations per second, producing over 14 distinct visual image-pictures per second, so that the screen indication appears as a visually continuous "motion picture" outline of the internal structure of the body being examined.

An "A-scan" indication of the echo pulse signals is simultaneously registered on the second oscilloscope screen 26 of control and indicating unit 19. A spot of light produced on the screen 26 is deflected horizontally by a sawtooth wave synchronized with the pulsing of the transducer, while received echo signals are used to deflect the spot in a vertical direction to produce "pips" on the screen 26. The positions of such pips, measured from the left side of the screen 26, are measures of the depths within the body of the interfaces producing the echo signals.

The portability of the assembly 11 is an important feature in that an operator can readily test any desired portion of the body, while holding the assembly in his hand and observing the indications on the screens 22 and 26. The assembly is also adapted to be carried by adjustable supporting means. In particular, as shown in FIGURE 2, the housing 14 of the transducer assembly 11 is adapted to be attached to a carriage 28 slidably attached to a pair of parallel cylindrical support rods 29 and 30 which are fastened at each end to a pair of support bars 32 and 33. The support bars 32 and 33 extend tangentially in a fixed parallel relation from diametrically opposed portions of a ring 34 which is constructed to slide circularly around a circular opening 36 in the metal support plate 37. The plate 37 is designed to slide easily into receptive slots of any suitable support frame, particularly by the frame which normally holds a palpation diaphragm for use with an X-ray fluoroscope system.

When the carriage 28 is midway between the support bars 32 and 33, the transducer 12 with its spherical face 38 downward is preferably on the axis of the ring 34, so that by moving the carriage 28 on the support rods 29 and 30, the transducer 12 may be moved radially outwardly until the carriage 28 engages one or the other of the bars 32 or 33. The angular position of the ring 34 may be adjusted as above described, so that the transducer 12 can thus be moved to any position within a certain radial distance from the axis of rotation of the ring 34.

To control movement of the carriage 28 on the support rods 29 and 30, a lead screw 41 extends between the bars 32 and 33 and is journalled for rotation about an axis parallel to the support rods 29 and 30. The lead screw 41 is rotatable either by hand wheel 42 or by a control motor 43.

To correlate indications produced on the screen 22 of the control and indicating unit 19 with movement of the carriage 28 along the support rods 29 and 30, a linear potentiometer unit 44 is secured to the bar 33 and has an actuating rod 46 parallel to the direction of movement of the carriage 28, with the end of rod 46 being secured to a plate 47 secured to the carriage 28. As the carriage 28 slides on the support rods 29 and 30, the potentiometer 44 causes the image field 21 to be shifted horizontally in response thereto by changing the voltage on the horizontal deflection plates behind the screen 22. With the support assembly of FIGURE 2 it is possible to use the transducer system of this invention in combination with an X-ray fluoroscope system for obtaining more comprehensive and intelligible diagnostic information than is obtained by either system alone. This combination of systems has proved extremely valuable for certain kinds of diagnostic testing.

FIGURE 3 shows the transducer assembly of the invention in cross section and more clearly shows the configuration of the transducer 12 with its convexly curved face 38. The transducer 12 is held firmly by the clamp ring 50 which is secured to a radially extending portion at the outer end of the shaft 13 in such a way that the transducer face 38 is located substantially on an axis of oscillation of shaft 13. The shaft 13 has an intermediate portion 53 integrally connected to the portion 51 and offset from the axis of oscillation, to facilitate engagement of the transducer face 38 with any desired point of the body 17. The shaft 13 rotatably protrudes from one end of the transducer assembly housing 14 which is generally cylindrical but has a bullet-shaped indented end portion or nose 54 shaped to further facilitate engagement of transducer face 38 with the body 17 while providing solid support of the transducer.

To produce the desired oscillation of transducer 12 the inner end of shaft 13 is coupled to be driven by an electric motor 58, and is also coupled to a forward end of shaft 59 of a resolver 61. The rearward end of resolver shaft 59 is coupled through a coupler 62 to a rotatable shaft 63 of a potentiometer 64. It should be noted that all important components (transducer face, motor, resolver, and arc controlling potentiometer) are on one common centerline of rotation, and are directly coupled mechanically to oscillate simultaneously. The way in which the desired oscillation is produced will be explained later in connection with FIGURE 4.

The shaft 13, inside the nose cone 54 fits snugly into a hollow cylindrical shaft or sleeve 66 which forms the shaft of the motor 58. The end portion 67 of hollow shaft 66 is preferably split, as by providing three or four equiangularly spaced slots thereon to provide positions which may be moved radially inwardly into clamping engagement with shaft 13, by means of a C-clamp 68 having ears 69 forced together by a screw 71. C-clamp 68 rotates with the rotating shaft 13 in a chamber 72 of nose cone 54, but the ears 69 are constructed to strike a protruding ridge of an extending front portion 73 of bullet nose 54 when the transducer has rotated approximately 90° from a midpoint position. The shaft 13 is thereby stopped from rotating more than 90° in either direction from the midpoint position, and this feature protects the wires to the transducer assembly from continued rotation in case of failure within the control mechanism. The extending portion 73 is cut away to provide easy access to the C-clamp 68, for quick installation and removal of the shaft 13.

Resting against the extending portion 73 of bullet nose 54 and forming most of one wall of the chamber 72 is a stainless steel seal washer 74, which fits snugly around the sleeve 66 and into a cylindrical chamber 76 concentric within bullet nose 54. The outer peripheral surface of washer 74 fits against the inside surface of chamber 76 and has an annular groove to receive an O-ring 77 for forming a waterproof seal around the outer surface of chamber 76. A Teflon seal ring 78 fits circularly around the sleeve shaft 66 and forms with the O-ring 79 and washer 74 a waterproof seal between the chamber 76 and the sleeve shaft 66. Because of the waterproof seals above described, the cylindrical chamber 76 and the inner working members of the transducer assembly are protected from contact with water or other fluids, thereby allowing the assembly to be operated while totally immersed. With this feature, the assembly may be used with a standard liquid coupling without danger to the equipment, while the assembly still maintains the unique features which allow direct coupling operation in two-dimensional sector scans without lateral motion of the transducer face.

A bearing assembly 81 is provided around the sleeve shaft 66 and within the cylindrical chamber 76, including an inner bearing member 85 forced toward the seal washer 74 by one end of a coil compression spring 82, the other end of which presses against the annular shoulder 83 of the sleeve shaft 66. The inner bearing member 85 and an outer bearing member 86 form races for ball bearings 88. The inner bearing member 85 rotates with sleeve shaft 66, while outer bearing member 86 remains stationary in the cylindrical chamber 76.

It is highly desirable that the angular position of the transducer shaft 13 be fixed relative to that of the resolver shaft 59, to correlate the indications produced on screen 22 with the position of the transducer assembly. For this purpose, the inner end of the shaft 13 has a transverse slot for locking engagement with a pin 91 extending transversely in the sleeve member 66, so as to permit location in only two positions 180° apart, one of the positions being obviously incorrect. The position of the sleeve shaft 66 is fixed relative to the resolver shaft 59 as hereinafter described.

The shaft 66 has an enlarged portion which fits snugly within the rotor 90 and at one end of the enlarged portion, an annular shoulder 92 is provided which engages one side of the rotor 90. Screws 93 serve to move a washer 94 toward the other end of the enlarged portion of shaft 66 and into clamping engagement with the other side of the rotor 90.

The rotor coils 95 are wound around poles on rotor 90 and are connected to commutator segments for contact with brushes 97, which are secured to the brush holders 98. A permanent magnet stator 99 supports the brush holders 98 and is suitably secured within the center section 102 of the transducer drive unit housing 14. Since the stator 99 of motor 58 is a permanent magnet, the direction of rotation of the rotor 90 is solely dependent upon the direction of current flow through the rotor coils 95, and the speed of rotor 90 depends on the applied voltage.

A hollow shaft or sleeve portion 103 extends rearwardly from the enlarged portion of shaft 66 to surround the resolver shaft 59, which is secured within the hollow shaft portion 103 by the clamp 104 around the end portion 106 thereof, in the same manner that clamp 68 secures shaft 13 within the sleeve shaft 66 to thereby fix the angular position of shaft 66 relative to shaft 59. The potentiometer 64 is carried by a plate 105 which is secured by a screw 107 to one end of a post 108, the other end of which receives a screw 109 threaded into the housing of resolver 61, with a nut 110 being provided on screw 109 to fix the post 108 to the screw 109.

The coupler 62 receives end portions of the resolver shaft 59 and the potentiometer shaft 63 and may be tightened by a screw 112 to tightly engage both shafts. A sealed housing generally designated by reference numeral 116 is provided for the resolver 61 and the potentiometer 64. In installation of the housing 116, screws 117, only one of which apears in the sectional view of FIGURE 3, are threaded into the housing section 102, with nuts 118 being threaded on the screws 117 and with the ends of spacer posts 119 being also threaded on screws 117. An end plate 120 is secured to the opposite ends of posts 119 by screws 121, with O-ring seals 121a being provided. A sleeve 122 has one end extending within the end of the housing section 102 and an opposite end around end plate 120, with suitable O-ring seals 123 provided, to thereby complete the sealed housing assembly 116. Sleeve 122 is held in position by a washer 124 held on the end plate 120 by a screw 125.

FIGURE 4 is a schematic block diagram illustrating the circuits used in controlling movement of the transducer 12 and in displaying indications therefrom. The oscillatory motion of transducer 12 is produced by the direct current motor 58, and the direction of rotation of the rotor thereof depends on the voltage polarity of the direct current received from a motor drive circuit 126, this voltage polarity being controlled by a relay 127 of a motor control circuit 128. In particular, the two movable contacts of relay 127 are connected to the two inputs of drive motor 58 in the transducer assembly housing 14, while fixed contacts 129 and 130 of relay 127 are connected together and are connected by a parallel combination of resistor 132, signal light 133, capacitor 134, and capacitor 135 to the other fixed contacts 136 and 137 which are also connected together. Fixed contacts 129 and 130 are connected through a diode 138 to one end of the secondary coil 139 of a power transformer 140, and are connected through a second diode 142 to the other end of secondary coil 139, while fixed contacts 136 and 137 are connected to a center tap 143 of secondary coil 139. The primary coil 144 of transformer 140 is connected across the variable voltage autotransformer 146, which is connected in parallel with the resistor 147 and series signal light 148, across the fixed contacts of the double pole double throw switch 149, having movable contacts connected across the AC line source 151. The alternating voltage of line source 151 is rectified by diodes 138 and 148 and by capacitors 134 and 135 to provide a relatively constant direct voltage to the fixed contacts of relay 127. Variable autotransformer 146 provides ready adjustment of the voltage supplied to motor 158, thereby allowing ready adjustment of the motor speed.

The polarity of the motor voltage, and therefore the motor rotation direction, is controlled by the position of the switch contacts of relay 127, which position is controlled by the relay coil 152 of relay 127. One end of relay coil 152 is connected to a negative voltage terminal 153 of a power supply 154, which may be minus 28 volts, for example. The other end of relay coil 152 is connected to a movable contact 156 of the relay 157 having a fixed contact connected to a positive terminal 158 of the power supply 154 which may be at plus 28, for example. The coil of the relay 157 is connected at one end to ground and at the other end to the emitter of a transistor 159 and through a resistor 161 to the negative terminal of a power supply 162 which may be at minus 30, for example. The collector of transistor 159 is connected to the positive terminal of power supply 162, which may be at plus 30 volts, while the base of transistor 159 is connected through adjustable resistor 160 to a movable contact 163 of the transducer assembly potentiometer 64, having end terminals 164 and 165.

Relay 157, which controls relay 127 and thereby controls the direction of rotation of motor rotor 90, is so constructed that a certain negative voltage is required at the emitter of transistor 159 to move contact 156 to one position, while a certain positive voltage is required to move it to its other position. Transistor 159 acts as an emitter follower, with the emitter voltage corresponding to the base voltage which, in turn, is controlled by the position of the movable contact 163 of potentiometer 64. When the potential of contact 163 reaches a certain positive level due to rotation of the motor rotor in one direction, the emitter voltage transistor 159 reaches a level which is sufficiently positive to energize relay 157 causing movable contact 156 to be connected to the terminal 158, and to activate relay 127 to move the movable contacts thereof to positions opposite those shown in FIGURE 4. The switching of relay 127 causes a reversal of polarity of the motor current and a reversal of the motor. When the rotor of the motor rotates far enough in the opposite direction, the negative potential of the contact 163 becomes sufficiently high to cause switching of the relay 157, to de-energize the relay 127, and to again reverse the direction of rotation of the motor.

As indicated above, the angular velocity of rotation of the motor rotor is determined by the DC voltage applied to the motor 58 which, in turn, is controlled by the position of the movable tap of the variable autotransformer 146. The angle between the limit positions, at which the motor is reversed, and the attitude are determined by the voltage applied to the end terminals 164 and 165 of potentiometer 64. Terminal 164 is connected through a resistor 167, a variable resistor 168 having a movable contact 169, a ganged variable resistor 171 having a movable contact 172 controlled by an adjustable knob 173, and a second ganged variable resistor 175 having a movable contact 176 controlled by a second adjustable knob 177, to a positive terminal 178 of a power supply 179 which may be at plus 300 volts, for example. Terminal 165 is connected through a resistor 181, a variable resistor 182 having a movable contact 183 ganged with contact 172, and a variable resistor 184 having a movable contact 185 ganged to the contact 176, to the negative terminal 186 of the power supply 179, which may be at minus 300 volts, for example.

The potential at movable contact 163 of potentiometer 64 varies with rotation of the shaft 63 between the potentials of end terminals 164 and 165, which potentials may be varied by adjustment of knobs 173 and 177.

When knob 173 is adjusted, the resistances of variable resistors 171 and 172 are changed in the same direction, either increased or decreased, to vary the angle between the limits of movement while maintaining an equal distance between such limits and a neutral position, so as to maintain the same attitude.

When knob 177 is adjusted, the resistances of the variable resistors 175 and 184 are varied in opposite directions, one being increased while the other is decreased, to adjust the attitude of the oscillatory movement, the angle between the limits of the oscillatory movement being maintained constant. The ganged resistors are preferably matched such that adjustment of knob 173 has no effect on attitude, while adjustment of knob 177 has no effect on the angle. Adjustable resistor 168 is provided for the purpose of obtaining balance.

It should be noted that resistor 160 in the base circuit of transistor 159 may be adjusted to obtain the same effect as adjustment of resistors 171 and 182 in controlling the angle between limits of movement.

To produce indications on the oscilloscope screens 22 and 26 in response to echo signals from the transducer 12 and in accordance with movements of the transducer 12, the transducer 12 is energized from a pulser 191 which has an input terminal 192 connected to a terminal 193 on a terminal board or jack of a unit 194. Unit 194 includes a cathode ray tube having the screen 26 for producing the A-scan indication, and also includes timing and sweep generating circuitry of a type conventional in the oscolloscope art. Such circuitry generates a timing signal at the terminal 193 which is applied to the input terminal 192 of the pulser 191 to cause the transducer 12 to emanate a burst of ultrasonic waves. Echo signals generated by the transducer 12 are applied to the input of an amplifier 196 having an output terminal 197 connected to a terminal 198 of the unit 194, to be applied through amplifier circuits thereof to the vertical deflection plates, and to produce pips on the screen 26 in response to such echo signals.

The output terminal 197 of the amplifier 196 is also connected to an input terminal 199 of a mixer 200 having an output terminal 201 connected to an input terminal 203 of a video amplifier 204 having an output terminal 205 connected to a terminal 206 of a terminal board or jack of a unit 208. Unit 208 includes a cathode ray tube having the above-described screen 22, and also includes conventional circuitry for applying voltages to the cathode ray tube to impinge an electron beam on the screen, as well as deflection circuitry for energizing horizontal and vertical deflection plates or coils. Terminal 206 is connected either directly or through an amplifier in the unit 208 to the grid of the cathode ray tube therein to intensify the electron beam and brighten the spot in response to echo signals produced by the transducer 12.

The resolver 61 is effective to translate angular movement of the shaft 13 into electrical signals for correlating indications on the screen 22 with the oscillation of the shaft. In particular, the resolver 61 includes a stator coil 211 and a pair of rotor coils 212 and 213 located at right angles to each other and inductively coupled to the stator coil 211, to generate signals havine sine and cosine functions of a signal applied to the stator coil 211.

Stator coil 211 is connected to an output terminal 214 of an amplifier 215 having an input terminal 216 connected to a terminal 217 of the unit 194. An internal sweep circuit of the unit 194 operates to generate a sawtooth signal at the terminal 217 which is amplified by the amplifier 215 and applied to the stator coil 211. The rotor coils 212 and 213 then develop corresponding sawtooth signals, having amplitudes which are sine and cosine functions of the angular position of the shaft 13.

Rotor coils 212 and 213 are respectively coupled to input terminals 220 and 221 of a keyed clamp circuit 222 having a pair of output terminals 223 and 224 connected to input terminals 225 and 226 of a cathode follower circuit 227 having output terminals 228 and 229 connected to terminals 231 and 232 of the unit 208. Terminals 231 and 232 are connected directly or through amplifier circuits in the unit 208 to the horizontal and vertical deflection plates or coils of the cathode ray tube therein. In the system as illustrated, the terminal 231 is connected to the horizontal deflection circuit and is controlled from the signal developed by coil 212, while terminal 232 is connected to the vertical deflection circuit and is controlled by the signal from coil 213.

The system may be operated in a manner such that with the axis of the transducer 12 in a vertical position, the coil 212 is at right angles to the stator coil 211, so that no signal is applied to the horizontal deflection input terminal 232, while the coil 213 is aligned with the stator coil 211 to generate a maximum signal which is applied to the vertical deflection input terminal 232. A vertical trace is then developed on the screen 22 starting at the apex 23 thereof and moving downwardly under control of the sawtooth sweep signal.

With the transducer 12 moving down slightly away from its vertical position, a signal is developed by the rotor coil 212 which is applied through the keyed clamp circuit 222 and the cathode follower 227 to the horizontal deflection input terminal 231, to thereby cause the sawtooth horizontal deflection signal of small amplitude to be applied along with the larger amplitude sawtooth vertical deflection signal. The trace then moves angularly downwardly and either to the left or right depending upon the direction of displacement of the transducer 12 from its vertical position, and with further movement away from the vertical position, the amplitude of the horizontal deflection signal is increased, while the amplitude of the vertical deflection signal is decreased. Accordingly, the position of the trace on the screen 22 accurately corresponds to the angular position of the transducer 12.

When the transducer 12 is oscillated, the trace on the screen 22 is caused to sweep through a certain arc about the apex 23, which is preferably adjacent the upper end of the screen 22, to thereby produce a sector scan indication, as diagrammatically illustrated in FIGURE 4.

The keyed clamp circuit 222 operates to fix the signal level at the output terminals 223 and 224 thereof during time intervals between the applied sawtooth signals. To control operation of the keyed clamp circuit 222, input terminals 235 and 236 thereof are connected to output terminals 237 and 238 of a clamp driver circuit 240 having input terminals 241 and 242 connected to output terminals 243 and 244 of a phase splitter circuit 245 having an input terminal 246 connected to an output terminal 248 of the unit 194. The timing and sweep circuitry of the unit 194 generates an unblanking pulse at the terminal 248 which is applied to the input terminal 246 of the phase splitter 245. The phase splitter 245 then operates to apply square wave signals of opposite polarity to the clamp driver circuit 240 which in turn operates the keyed clamp circuit 222 to fix the levels during time intervals between the sawtooth signals.

The levels at which the signals are fixed are controllable to control the position of the trace or sector scan produced on the screen 22. In particular, the potentiometer 44 and a manually adjustable potentiometer 250 are connected to terminals 251 and 252 of the keyed clamp circuit 222 and terminals 253 and 254 of the cathode follower 227. As above described, the potentiometer 44 is controlled by movement of the carriage 28, and it operates to shift the base level of the horizontal deflection signal, so that the trace or the sector scan indication is moved horizontally on the screen 22 in response to movement of the carriage 28.

It is noted at this point that although the horizontal and vertical relationship of the movements and indications is generally preferred, the movements can be effected in any direction, and the terms horizontal and vertical are used herein only for ease and clarity of description, and are not to be construed as limitations.

The mixer 200 has an input terminal 256 to which the unblanking signal from terminal 248 is applied. An additional input terminal of the mixer 200 is connected to the output of a ramp generator 257 having an input connected to the terminal 126 of the unit 194. Ramp generator 257 is of a type known in the radar art and applies a signal to increas ethe amplification of echo signals in proportion to the distance from the transducer so as to compensate for attenuation of signals and also to compensate for the fact that with the sector scan the separation of trace lines increase in proportion to the distance from the transducer.

As noted above, a very important feature of the invention resides in effecting the scanning movement at a rapid rate such as to produce a visible indication of moving reflecting interfaces without flicker. In the illustrated system, the oscillations of the transducer back and forth should be effected at the rate of at least 7.5 complete oscillations per second, to produce 15 scans per second, and preferably the oscillations are effected at the rate of at least 10 oscillations per second to produce 20 scans per second. The oscillations are most preferably effected at an even higher rate to avoid distortions and obtain an accurate indication of distance. The fast scan feature is very important in permitting interpretation of an indication while it is being produced on the screen 22 and is also important if a camera is used for recording the indication produced at a particular time in avoiding a blurring effect which is produced with a slow scan operation.

The pulsing rate, i.e. the repetition rate of the sawtooth signals applied to the resolver stator coil 211 should be much higher than the scanning rate, preferably on the order of 500 per second, in order to avoid distortions of the pattern in the screen 22 and in order to obtain the highest possible accuracy.

It will be understood that modifications and variations may be effected without departing from the spirit and scope of the novel concepts of this invention.

We claim as our invention:

1. In ultrasonic apparatus for the examination of a body including an ultrasonic transducer for engagement with a surface portion of the body to transmit and receive ultransonic waves along a first axis, an assembly for oscillating said transducer, comprising: a reversible electric motor having a stator and a rotor rotatable on a second axis generally transverse to said first axis, a direct mechanical coupling between said rotor and said transducer, and means for reversing said motor at certain angular positions of said rotor to effect oscillation of said transducer.

2. In ultrasonic apparatus for the examination of a body including an ultrasonic transducer for engagement with a surface portion of the body, an assembly for oscillating said transducer, comprising: a reversible electric motor having a stator and a rotor, a mechanical coupling between said rotor and said transducer, means for reversing said motor at certain angular limit positions of said rotor to effect oscillation of said transducer, first adjustment means for adjusting the angular spacing between said limit positions while maintaining an equal spacing of said limit positions from a neutral position, and second adjustment means for adjusting the positions of both of said limit positions and of said neutral position without changing the spacing between said limit positions.

3. In ultrasonic apparatus for the examination of a body including an ultrasonic transducer for engagement with a surface portion of a body to transmit and receive ultrasonic waves along a first axis, an assembly for oscillating said transducer about a second axis generally transverse to said first axis and close to and generally parallel to said surface portion, comprising: an electric motor having a stator and a rotor rotatable within said stator about said second axis, and elongated shaft means interconnecting said rotor and said transducer.

4. In ultrasonic apparatus for the examination of a body including an ultrasonic transducer for engagement with a surface portion of the body to transmit and receive ultrasonic waves along a first axis, an assembly for oscillating said transducer about a second axis generally transverse to said first axis and close to and generally parallel to said surface portion, comprising: a reversible electric motor having a stator and a rotor rotatable within said stator about said second axis, thereby to provide an oscillation system having a low moment of inertia to permit quick reversal of the direction of rotation of said motor at said angular positions of said rotor.

5. In ultrasonic apparatus for the examination of a body including an ultrasonic transducer for engagement with a surface portion of the body to transmit and receive ultrasonic waves along a first axis, an assembly for oscillating said transducer about a second axis generally transverse to said first axis comprising: an electric motor having a stator and a rotor within said stator, elongated shaft means interconnecting said rotor and said transducer and arranged for supporting said bearing means for supporting said transducer generally in alignment with said second axis, bearing means for supporting said shaft means at a point intermediate said rotor and said transducer, and housing means supporting said stator and including an end portion supporting said bearing means with the radial distance from said second axis to the outer surface of at least one side of said end portion being substantially less than the radius of said stator to facilitate placing of said transducer in engagement with a desired surface portion of the body.

6. In ultrasonic apparatus for the examination of a body including an ultrasonic transducer for engagement with a surface portion of the body, an assembly for oscillating said transducer, comprising: an electric motor having a stator and a rotor within said stator, and elongated shaft means interconnecting said rotor and said transducer and arranged for supporting said transducer generally in alignment with the axis of said rotor, said shaft means having a portion offset from said axis to facilitate placing of said transducer in engagement with a desired surface portion of the body.

7. In ultrasonic apparatus for the examination of a body including an ultrasonic transducer for engagement with a surface portion of the body, means for oscillating said transducer about an axis close to and generally parallel to said surface portion, indicating means electrically coupled to said transducer, resolver means for transmitting electrical signals to said indicating means corresponding to the angular position of said transducer, said resolver means being located in alignment with said axis is spaced relation to said transducer, and a direct mechanical coupling including elongated shaft means between said transducer and said resolver.

8. In ultrasonic apparatus for the examniation of a body including an ultrasonic transducer for engagement with a surface portion of a body, an assembly for oscillating said transducer about an axis close to and generally parallel to said surface portion, comprising: an electric motor having a stator and a rotor rotatable within said stator about said axis, elongated shaft means interconnecting said rotor and said transducer, indicating means electrically coupled to said transducer, and resolver means directly coupled to said rotor and arranged to transmit electrical signals to said indicating means corresponding to the angular position of said rotor.

9. In ultrasonic apparatus for the examination of a body including an ultrasonic transducer, a reversible electric motor mechanically coupled to said transducer for oscillating said transducer about a certain axis, means for producing an electrical signal having an amplitude varying with the angular position of said transducer about said axis, switching means having a first stable state in which said motor is energized in one direction and a second stable state in which said motor is energized in the reverse direction, and means for switching said switching means to said first stable state at one level of said signal and to said second stable state at another level of said signal.

10. In ultrasonic apparatus for the examination of a body including an ultrasonic transducer, a reversible electric motor mechanically coupled to said transducer for oscillating said transducer about a certain axis, potentiometer means having end terminals and having a movable contact mechanically coupled to said transducer, a voltage source, means for applying voltages from said source to said end terminals to develop at said movable contact a signal having a level varying with the angular position of said transducer about said axis, means for energizing siad motor in one direction at one level of said signal and in a reverse direction at another level of said signal, and means for adjusting the voltages applied to said end terminals from said voltage source to adjust the angular positions of reversing of said motor.

11. In ultrasonic apparatus for the examination of a body including an ultrasonic transducer, a reversible electric motor mechanically coupled to said transducer for oscillating said transducer about a certain axis, potentiometer means having end terminals and having a movable contact mechanically coupled to said transducer, a voltage source, means for applying voltages from said source to said end terminals to develop at said movable contact a signal having a level varying with the angular position of said transducer about said axis, means for energizing said motor in one direction at one level of said signal and in a reverse direction at another level of said signal, and means for adjusting the voltages applied to said end terminals from said voltage source to adjust the angular positions of reversing of said motor, and angle control means for simultaneously adjusting the voltages applied from said source to said end terminals in opposite directions to adjust the angular positions of reversals of said motor while maintaining equal angles between said angular positions and a neutral position.

12. In ultrasonic apparatus as defined in claim 11, said angle control means comprising a pair of ganged variable resistors connected in series between said end terminals and said voltage source with the resistances of said resistors being changed in the same direction during adjustment thereof.

13. In ultrasonic apparatus for the examination of a body including an ultrasonic transducer, a reversible electric motor mechanically coupled to said transducer for oscillating said transducer about a certain axis, potentiometer means having end terminals and having a movable contact mechanically coupled to said transducer, a voltage source, means for applying voltages from said source to said end terminals to develop at said movable contact a signal having a level varying with the angular position of said transducer about said axis, means for energizing said motor in one direction at one level of said signal and in a reverse direction at another level of said signal, and attitude control means for simultaneously adjusting the voltages applied from said source to said end terminals in the same direction to adjust the angular positions of reversal of said motor while maintaining a fixed angle between said angular positions.

14. In ultrasonic apparatus as defined in claim 13, said attitude control means comprising a pair of ganged variable resistors connected in series between said end terminals and said voltage source with the resistance of said variable resistors being changed in opposite directions during adjustment thereof.

15. In ultrasonic apparatus for the examination of a body including ultrasonic transducer oscillatable about a certain axis, a reversible electric motor for oscillating said transducer, a resolver for developing electrical signals corresponding to the angular position of said transducer, means including a potentiometer for controlling the energization of said motor to control the oscillation of said transducer, said motor, resolver and potentiometer being on said certain axis, and means directly coupling said motor, said resolver and said potentiometer to said transducer.

16. In ultrasonic apparatus for the examination of a body including an ultrasonic transducer for engagement with a surface portion of a body, an assembly for oscillating said transducer about an axis close to and generally parallel to said surface portion, comprising: an electric motor having a stator and a rotor rotatable within said stator about said axis, and elongated shaft means interconnecting said rotor and said transducer and including a hollow shaft having one end connected to said rotor and an opposite end intermediate said rotor and said transducer, an additional rigid shaft having one end connected to said transducer and an opposite end extending within said hollow shaft, and releasable clamp means between said opposite end of said hollow shaft and said additional shaft.

References Cited
UNITED STATES PATENTS

| 3,086,390 | 4/1963 | Brown. |
| 3,159,023 | 12/1964 | Steinbrecher _____ 73—678 |
| 3,256,733 | 6/1966 | Carlin. |

FOREIGN PATENTS

| 604,722 | 9/1960 | Canada. |
| 369,538 | 1932 | Great Britain. |

LAWRENCE W. TRAPP, *Primary Examiner.*